(12) United States Patent
Watazawa

(10) Patent No.: US 8,447,180 B2
(45) Date of Patent: May 21, 2013

(54) IMAGING APPARATUS

(75) Inventor: Yasuyuki Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 12/877,880

(22) Filed: Sep. 8, 2010

(65) Prior Publication Data

US 2011/0064398 A1    Mar. 17, 2011

(30) Foreign Application Priority Data

Sep. 14, 2009   (JP) ................. 2009-211181

(51) Int. Cl.
G03B 15/03    (2006.01)
(52) U.S. Cl.
USPC ......................... 396/176; 396/264
(58) Field of Classification Search
USPC .......................... 396/187, 176, 264
See application file for complete search history.

(56) References Cited

U.S. PATENT DOCUMENTS

| | | | | |
|---|---|---|---|---|
| 4,641,943 A | * | 2/1987 | Neely | 396/206 |
| 5,097,285 A | * | 3/1992 | Wakabayashi et al. | 396/264 |
| 5,448,331 A | * | 9/1995 | Hamada et al. | 396/106 |
| 5,555,071 A | * | 9/1996 | Koenig et al. | 396/155 |
| 5,561,462 A | * | 10/1996 | Nagano | 348/372 |
| 2002/0191097 A1 | | 12/2002 | Kobayashi | |
| 2006/0006844 A1 | * | 1/2006 | Koyama | 320/166 |

FOREIGN PATENT DOCUMENTS

| | | | |
|---|---|---|---|
| JP | 2002-369042 A | | 12/2002 |
| JP | 2003255445 A | * | 9/2003 |

OTHER PUBLICATIONS

Translation of JP Publication No. 2003-255445; Title: Photographing Device; Inventor: Yamauchi, Nobuhiro; Publication Date: Sep. 10, 2003.*

* cited by examiner

*Primary Examiner* — W B Perkey
*Assistant Examiner* — Fang-Chi Chang
(74) *Attorney, Agent, or Firm* — Carter, DeLuca, Farrell & Schmidt LLP

(57) ABSTRACT

An imaging apparatus includes an image sensor, a display unit configured to display an image acquired from the image sensor, and a control unit configured to perform a live view display of an image of an object on the display unit for a user to observe the object and to perform photographing after a self-timer setting time elapses from when a photographing start operation is performed, wherein the control unit compares, when performing the live view display, time required for charging a flash and the self-timer setting time, and if the self-timer setting time is longer than the time required for charging the flash, the control unit does not cause a charging operation of the flash to be performed before starting to count the self-timer setting time and causes the charging operation of the flash to be performed after starting to count the self-timer setting time.

6 Claims, 4 Drawing Sheets

IMAGING APPARATUS

BACKGROUND OF THE INVENTION

1. Field of the Invention

The present invention relates to an imaging apparatus which includes a live view function and a self-timer function.

2. Description of the Related Art

In recent digital cameras, a photographer can observe an object to be photographed on an optical finder, or a live view display of a continuous image of the object which is output from an image sensor on a liquid crystal display (LCD) device, such as a thin-film transistor (TFT)-LCD. For example, Japanese Patent Application Laid-Open No. 2002-369042 discusses a technique in which a photographer uses a selecting switch to set a live view display mode for displaying the live view, or a finder display mode. If the live view display mode is set, a light path for transmitting object light information is acquired on the image sensor side, and if the finder display mode is set, the light path is acquired on the optical finder side. The photographer can thus observe the object by either the live view display or the optical view finder.

Further, a majority of digital cameras include a self-timer function in which photographing is performed after a predetermined time elapses from when the photographer presses a release switch. Some digital cameras allow the photographer to select the predetermined time, i.e., a self-timer setting time, from a plurality of setting times, or to set the time arbitrarily.

Furthermore, if flash photographing is to be performed, the flash is charged when the photographer starts to prepare for photographing so that flash photographing can be performed any time. The timing at which the photographer starts preparing for photographing is when the photographer pops up a built-in flash device by half-pressing the release switch or performing an auto focus. The flash is also charged after photographing to prepare for the next photographing.

However, if the flash is charged at the above described timing while the digital camera is performing the live view display, the following problem occurs. A transformer included in a flash charging circuit generates magnetic field lines that may be transferred as noise onto the image sensor which outputs the continuous image of the live view display. As a result, a live view display screen becomes deteriorated. To solve such a problem, there is a known method for suspending the live view display by a black-out of the display screen while charging the flash to prevent the screen from being deteriorated. However, in this method, the photographer cannot confirm composition using the live view display while the flash is being charged.

In particular, in the case of the self-timer photographing, the photographing is actually performed after a few seconds, i.e., the self-timer setting time, has elapsed from the photographer fully-pressing the release switch after half-pressing the release switch to prepare for photographing. It is thus unnecessary to charge the flash at the above described timing when the photographer starts to prepare for photographing. Further, suspension of the live view display to charge the flash obstructs photographing and is thus stressful for the photographer.

SUMMARY OF THE INVENTION

According to an aspect of the present invention, an imaging apparatus includes an image sensor, a display unit configured to display an image acquired from the image sensor, and a control unit configured to perform a live view display of an image of an object on the display unit for a user to observe the object and to perform photographing after a self-timer setting time elapses from when a photographing start operation is performed, wherein the control unit compares, when performing the live view display, time required for charging a flash and the self-timer setting time, and if the self-timer setting time is longer than the time required for charging the flash, the control unit does not cause a charging operation of the flash to be performed before starting to count the self-timer setting time and causes the charging operation of the flash to be performed after starting to count the self-timer setting time.

According to the present invention, if the self-timer setting time is longer than the time required for charging the flash, the photographer can confirm composition using the live view display while the flash is being charged.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
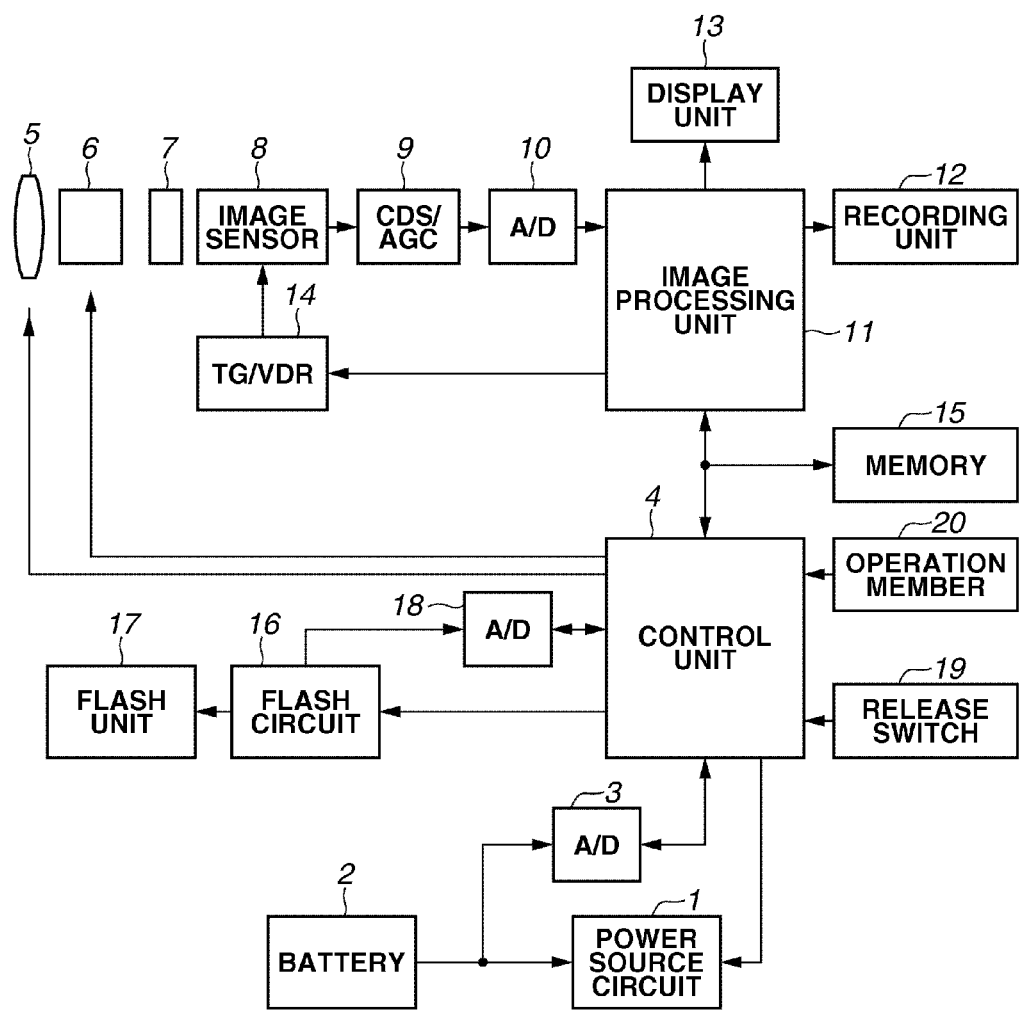
FIG. 1 is a block diagram illustrating a circuit configuration of a digital camera according to an exemplary embodiment of the present invention.

FIG. 1 is a block diagram illustrating a configuration of a digital camera, i.e., an imaging apparatus, according to an exemplary embodiment of the present invention.

Referring to FIG. 1, a power source circuit unit 1 receives power from a battery 2 and forms a stabilized power supply, so that each of the components of the circuit to be described below can operate. An analog-to-digital (A/D) conversion circuit 3 converts an analog voltage output from the battery 2 to a digital voltage and outputs the digital voltage to a control unit 4 described below. The control unit 4 controls the entire digital camera. The control unit 4 determines whether the camera can be operated based on the battery voltage acquired from the A/D conversion circuit 3. The control unit 4 also outputs to the power source circuit unit 1 a control signal for supplying power to each component according to the various operation modes. Further, the control unit 4 includes a timer function and counts the timer when performing self-timer photographing.

There is an optical system (hereinafter referred to as lens) 5 for photographing provided. An actuator 6 which adjusts a diaphragm or a focus of the lens 5 is controlled based on an instruction from the control unit 4. An object light transmitted via the lens 5 is input to an optical filter 7 which is formed by an integration of an optical low-pass filter and an infrared cut filter. An image sensor 8 is a two-dimensional area sensor such as a charge-coupled device (CCD) or a complementary metal-oxide semiconductor (CMOS). The object light is formed into an image on the image sensor 8 via the optical filter 7, and the image sensor 8 converts the optical image to an electric signal.

A correlated double sampling/automatic gain control (CDS/AGC) 9 performs noise reduction and gain adjustment on the signal output from the image sensor 8. An A/D conversion circuit 10 converts the input analog signal to a digital signal. An image processing unit 11 performs image processing on the image information, such as color tone adjustment, contrast adjustment, and edge enhancement (contour enhancement). The image processing unit 11 also performs image data conversion, such as compression and decompression of the image information, for storing and reading the image information to and from a recording unit 12. The recording unit 12 such as a semiconductor memory, a magnetic disk, and an optic disk, records the captured image information. The image processing unit 11 outputs information about brightness or sharpness of the image to the control unit 4.

A display unit 13 displays information output from the image processing unit 11. More specifically, the display unit 13 such as the LCD device displays a photographed image, various pieces of photographing information and setting information, whether the battery is attached or not, and a remaining battery capacity. A timing generator vertical driver (TG/VDR) 14 is activated by a signal from the image processing unit 11, and generates a clock signal to be supplied to the image sensor 8. A memory 15 which is connected to the control unit 4 and the image processing unit 11 stores programs to be provided thereto, temporarily stores the photographed image, and is used as a work area.

A flash circuit unit 16 includes a charging circuit unit and a flash light control unit. The charging circuit unit charges a capacitor with energy for flash emission, i.e., performs a flash charging operation based on a charging control signal from the control unit 4. Further, the flash light control unit causes a flash light emitting unit 17 formed of a xenon (Xe) tube or a white color light-emitting diode (LED) to emit the flash light based on the flashing control signal from the control unit 4. An A/D conversion circuit 18 converts an input analog voltage signal of the flash capacitor to the digital signal. A release switch 19 is used for instructing start of the photographing preparation operation and the photographing operation and is connected to the control unit 4.

The control unit 4 calculates a flash charging time from the battery voltage acquired from the A/D conversion circuit 3 and the voltage of the flash capacitor acquired from the A/D conversion circuit 18. Further, upon detecting that the photographer has half pressed the release switch 19, the control unit 4 controls the actuator 6 and instructs start of the photographing preparation operation, such as performing auto focus (AF) processing and auto-exposure (AE) processing. Further, upon detecting that the photographer has fully pressed the release switch 19, the control unit 4 controls the actuator 6 and instructs start of the photographing operation, such as exposure processing for causing the image sensor 8 to pick up an optical image, and flash emission (EF) processing. Furthermore, if the control unit 4 detects that the photographer has fully pressed the release switch 19 in the self-timer photographing mode, the control unit 4 starts counting the timer. Upon completion of counting the timer (i.e., when the self-timer setting time ends), the control unit 4 instructs the start of the photographing operation. More specifically, the control unit 4 controls the actuator 6 and instructs start of the photographing operation, such as the exposure processing for causing the image sensor 8 to pick up the optical image, and the flash emission (EF) processing.

An operating member 20 which is connected to the control unit 4 includes various operating members, such as a main switch of the digital camera main body, a reproduction switch, and switches for setting and selecting the camera operations. The photographer can select, by operating the operating member 20, the self-timer photographing mode for executing the self-timer function, or the live view mode for performing photographing by executing the live view display function.

Figure 2A:
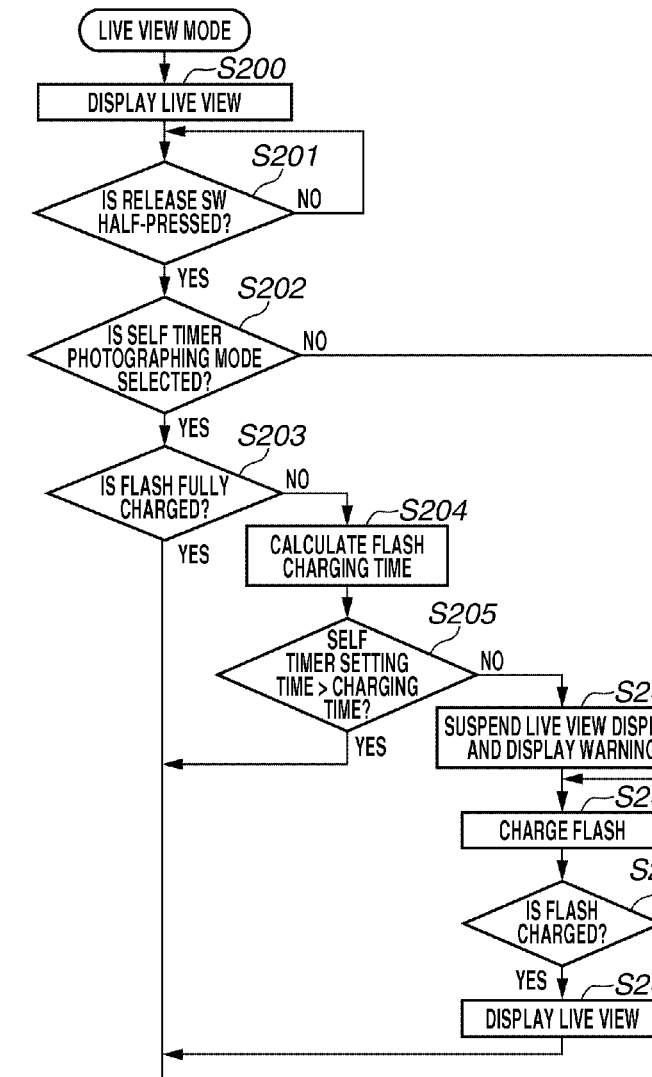
FIG. 2 is a flowchart illustrating an operation performed in a live view mode.
Figure 2B:
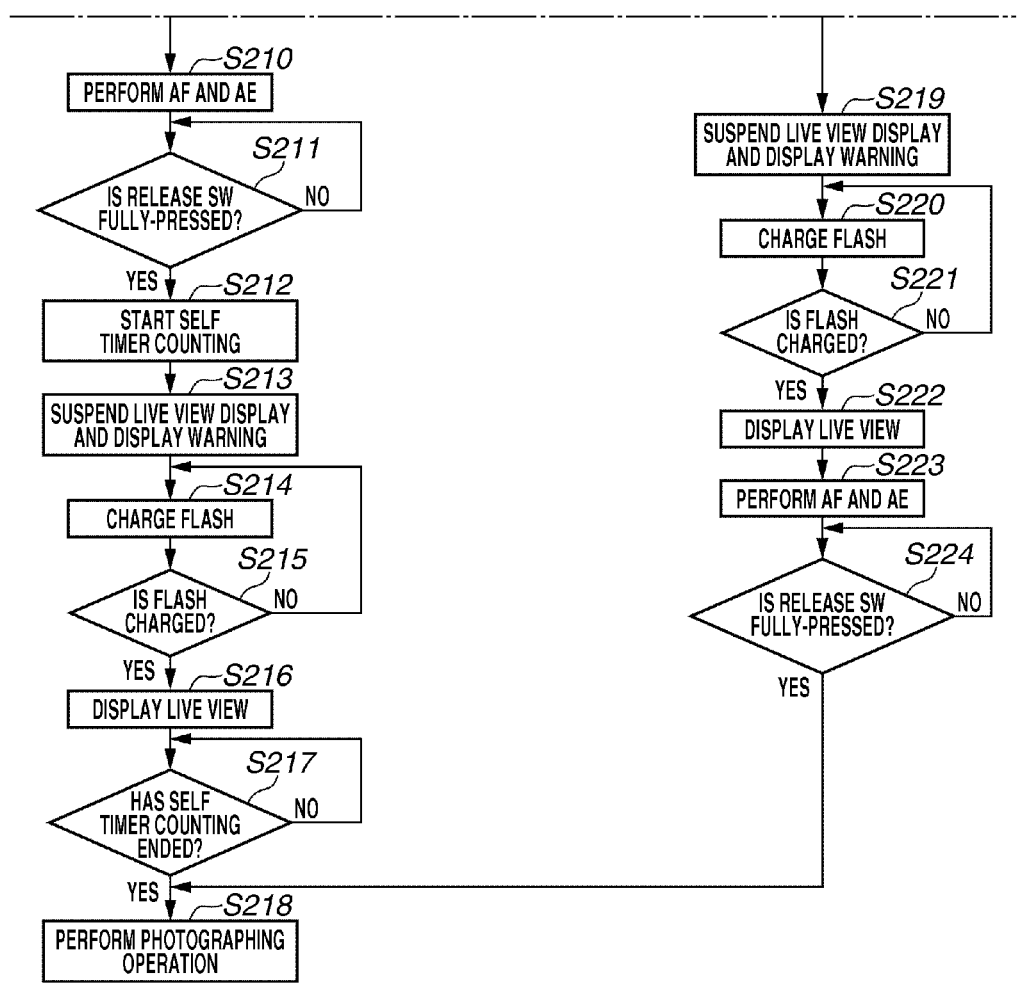

FIG. 2 is a flowchart illustrating a process sequence including determination of whether to perform the flash charging operation before the live view photographing operation in the above described digital camera.

In step S200, the digital camera starts the live view display. In step S201, the control unit 4 determines whether the photographer has half-pressed the release switch 19 while the live view display is being performed. If the control unit 4 determines that the photographer has not half-pressed the release switch 19 (NO in step S201), the control unit 4 stands by for an operation in step S201. If the control unit 4 then detects that the photographer has half-pressed the release switch 19 (YES in step S201), the process proceeds to step S202. In step S202, the control unit 4 determines whether the self-timer photographing mode is selected. If the self-timer photographing mode is selected (YES in step S202), the process proceeds to step S203. If the self-timer photographing mode is not selected (NO in step S202), the process proceeds to step S219.

In step S203, the control unit 4 acquires from the flash circuit unit 16 and the A/D conversion circuit 18 the charging voltage of the capacitor that stores the energy for flash emission and determines whether the flash is fully charged. If the flash is fully charged (YES in step S203), the control unit 4 determines that it is not necessary to perform the flash charging operation, and the process proceeds to step S210. If the flash is not fully charged (NO in step S203), the process proceeds to step S204.

In step S204, the control unit 4 acquires the voltage of the attached battery 2 from the power supply circuit unit 1 and the A/D conversion circuit 3. The control unit 4 then calculates the flash charging time, i.e., the time for fully charging the capacitor, from the battery voltage and the charging voltage of the capacitor acquired in step S203.

In step S205, the control unit 4 compares the self-timer setting time for performing the self-timer photographing with the flash charging time (indicated as charging time in FIG. 2 and FIG. 3) calculated in step S204. If the control unit 4 determines that the self-timer setting time is longer than the flash charging time (YES in step S205), the control unit 4 determines that it is not necessary to perform the flash charging operation at this point. The process thus proceeds to step S210. On the other hand, if the self-timer setting time is shorter than the flash charging time (NO in step S205), the control unit 4 determines that it is necessary to perform the flash charging operation at this point so that the flash can be emitted immediately after starting the photographing operation. The process thus proceeds to step S206.

In step S206, the control unit 4 suspends the live view display on the display unit 13 via the image processing unit 11 and displays a warning on the display unit 13 to notify the photographer that the flash is being charged. In step S207, the control unit 4 transmits a flash charging control signal to the flash circuit unit 16 to cause the flash circuit unit 16 to execute the flash charging operation on the capacitor which stores the energy for flash emission. In step S208, the control unit 4 determines whether the capacitor is fully charged. If the capacitor is not yet fully charged (NO in step S208), the process returns to step S207, and the processes of step S207 and step S208 are repeated until the capacitor is fully charged. When the capacitor is fully charged (YES in step S208), the process then proceeds to step S209. In step S209, the control unit 4 resumes the live view display on the display unit 13 via the image processing unit 11. The process then proceeds to step S210.

In step S210, the control unit 4 controls the actuator 6 to perform the operations such as the AF processing and the AE processing. In step S211, the control unit 4 determines whether the photographer has fully pressed the release switch 19. If the release switch 19 is not fully pressed (NO in step S211), the control unit 4 stands by for an operation in step S211. If it is determined that the release switch 19 is fully pressed (YES in step S211), the process proceeds to step S212. In step S212, the control unit 4 uses a timer count function to start counting the self-timer setting time. In step S213, the control unit 4 suspends the live view display on the display unit 13 via the image processing unit 11 and displays a warning indicating that the flash is being charged.

In step S214, the control unit 4 transmits the flash charging signal to the flash circuit unit 16 and causes the flash circuit unit 16 to charge the capacitor.

If the control unit 4 determines that the self-timer setting time is longer than the flash charging time in step S205 and determines that it is not necessary to perform the flash charging operation at that point, the proceeds to step S210 and then to step S214. In this case, the control unit 4 causes the flash charging operation to be performed for the first time in step S214. In other words, if the self-timer setting time is longer than the flash charging time, the control unit 4 changes the timing of performing the flash charging operation, so that the flash is charged while the self-timer setting time is counted after starting the photographing operation. In such a case in which the self-timer setting time is longer than the flash charging time, the control unit 4 does not suspend the live view display even when the photographing preparation operation is performed to allow the photographer (user) to confirm composition on the live view display. As a result, the photographer can confirm the composition on the live view display without any stress.

In step S215, the control unit 4 determines whether the capacitor is fully charged. If the capacitor is not fully charged (NO in step S215), the process returns to step S214. The processes of step S214 and step S215 are then repeated until the capacitor is fully charged. When the capacitor is fully charged (YES in step S215), the process proceeds to step S216. In step S216, the live view display is resumed. In step S217, the control unit 4 determines whether the self-timer count (i.e., the self-timer setting time) has ended. If the self-timer count has not ended (NO in step S217), the control unit 4 stands by for the end of counting in step S217. If the control unit 4 then determines that the self-timer count has ended (YES in step S217), the process proceeds to step S218. In step S218, the control unit 4 controls the actuator 6 to perform the photographing operation such as the exposure processing for causing the image sensor 8 to pick up the optical image and the EF processing.

In step S202, if the control unit 4 determines that the self-timer photographing mode is not selected (NO in step S202), the control unit 4 determines that it is necessary to charge the flash, and the process proceeds to step S219. In step S219, the control unit 4 then suspends the live view display on the display unit 13 via the image processing unit 11 and displays the warning indicating that the flash is being charged. In step S220, the control unit 4 transmits the flash charging control signal to the flash circuit unit 16 and causes the flash circuit unit 16 to charge the capacitor. In step S221, the control unit 4 determines whether the capacitor is fully charged. If the capacitor is not fully charged (NO in step S221), the process returns to step S220. The processes of step S220 and step S221 are then repeated until the capacitor is fully charged. When the capacitor is fully charged (YES in step S221), the process proceeds to step S222.

In step S222, the control unit 4 resumes the live view display on the display unit 13 via the image processing unit 11. In step S223, the control unit 4 controls the actuator 6 to perform the operations such as the AF processing and the AE processing. In step S224, the control unit 4 determines whether the photographer has fully pressed the release switch 19. If the release switch 19 is not fully pressed (NO in step S224), the control unit 4 stands by for an operation in step S224. If the control unit 4 then determines that the release switch 19 is fully pressed (YES in step S224), the process proceeds to step S218. In step S218, the control unit 4 controls the actuator 6 to perform the photographing operations such as the exposure processing in which the image sensor 8 picks up the optical image, and the EF (flash emission) processing.

Figure 3:
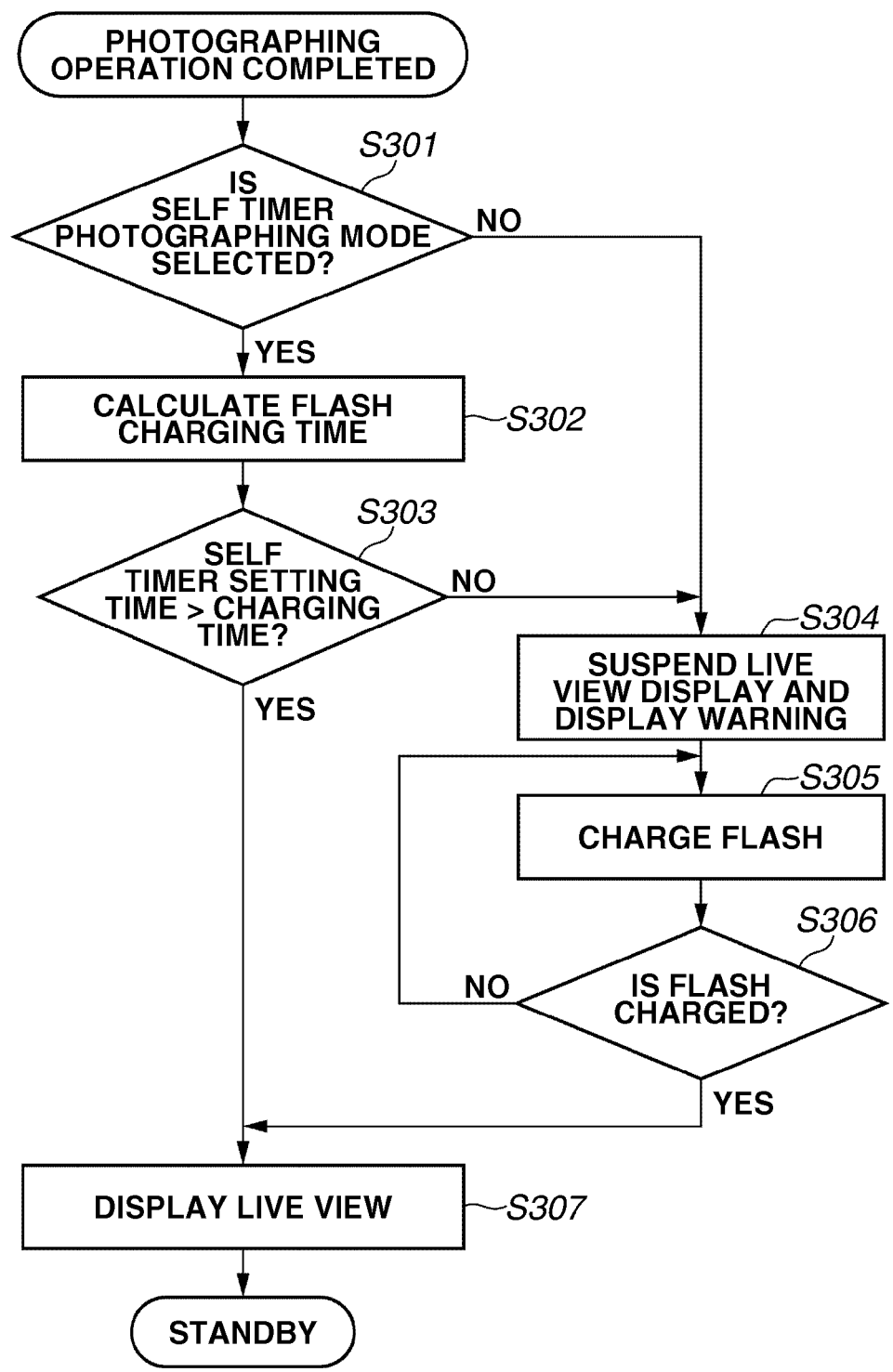
FIG. 3 is a flowchart illustrating an operation performed after the photographing operation has ended.

FIG. 3 is a flowchart illustrating an operation including determination of whether to immediately perform the flash charging operation after the photographing operation in the live view mode is completed.

In step S301, after the photographing operation in the live view mode is completed, the control unit 4 determines whether the self-timer photographing mode is selected as the photographing mode. If the self-timer photographing mode is selected (YES in step S301), the process proceeds to step S302. On the other hand, if the self-timer photographing mode is not selected (NO in step S301), the process proceeds to step S304.

In step S302, the control unit 4 acquires the voltage of the attached battery 2 from the power source circuit unit 1 and the A/D conversion circuit 3. The control unit 4 also acquires the charging voltage of the capacitor from the flash circuit unit 16 and the A/D conversion circuit 18. The control unit 4 then calculates the flash charging time for fully charging the capacitor from the acquired battery voltage and the charging voltage of the capacitor.

In step S303, the control unit 4 compares the self-timer setting time with the flash charging time calculated in step S302. If the control unit 4 determines that the self-timer setting time is longer than the flash charging time (YES in step S303), the control unit 4 determines that it is not necessary to perform the flash charging operation at this point, and the process proceeds to step S307. If the control unit 4 determines that the self-timer setting time is shorter than the flash charging time (NO in step S303), the control unit 4 determines that it is necessary to charge the flash at this point, and the process proceeds to step S304.

In step S304, the control unit 4 suspends the live view display on the display unit 13 via the image processing unit 11 and displays the warning indicating that the flash is being charged. In step S305, the control unit 4 transmits the flash charging control signal to the flash circuit unit 16 and causes the flash circuit unit 16 to charge the capacitor. In step S306, the control unit 4 determines whether the capacitor is fully charged. If the capacitor is not fully charged (NO in step S306), the process returns to step S305, and the processes of step S305 and step S306 are then repeated until the capacitor is fully charged. When the capacitor is fully charged (YES in step S306), the process proceeds to step S307.

In step S307, the control unit 4 resumes the live view display on the display unit 13 via the image processing unit 11 and shifts to a standby mode to prepare for an operation by the photographer, such as pressing the release switch 19.

In step S303, when the control unit 4 determines that the self-timer setting time is longer than the flash charging time (YES in step S303), the control unit 4 determines that it is not necessary to perform the flash charging operation at this point. The process thus proceeds to step S307, and the live view display is immediately started. In other words, when the self-timer setting time is longer than the flash charging time, the flash can be charged while the self-timer setting time is being counted after starting the photographing operation. The timing of performing the flash charging operation is thus changed. This is because if the self-timer setting time is longer than the flash charging time, it is useful for the photographer to immediately start the live view display after completing the photographing operation so that the photographer (user) can confirm the composition on the live view display. As a result, the photographer can confirm the composition on the live view display without any stress.

According to the above described exemplary embodiment, if it is determined, before starting the photographing operation, that the self-timer setting time is longer than the charging time of the capacitor which stores the energy for flash emission (YES in step S205), the flash is not charged immediately after starting the photographing preparation operation. In such a case, the live view display is continued. Further, the timing of the flash charging operation is thus changed to be performed while counting the self-timer after performing the photographing operation (i.e., processes of step S211 to step S215).

As described above, when the self-timer setting time is longer than the flash charging time, the live view display is not suspended while performing the photographing operation. The photographer can thus continue to confirm the composition and does not need to feel any unnecessary stress.

Further, if it is determined, after completing the photographing operation, that the self-timer setting time is longer than the charging time of the capacitor which stores the energy for flash emission (YES in step S303), the flash is not immediately charged even when the self-timer photographing mode has been selected. In such a case, the live view display is continued. Further, the timing of the flash charging operation is thus changed to be performed while counting the self-timer after performing the photographing operation (i.e., processes of step S211 to step S215).

As described above, when the self-timer setting time is longer than the flash charging time, the live view display is immediately started after the photographing operation has been completed. The photographer can thus immediately confirm the composition and does not need to feel any unnecessary stress.

The image sensor 8 corresponds to an image sensor according to the present invention, and the display unit 13 corresponds to a display unit which displays an image acquired from the image sensor according to the present invention. Further, when the live view mode is set using the operation member 20, the control unit 4 performs the live view display of an object image on the display unit 13. Furthermore, when the self-timer photographing mode is set using the operation member 20, the control unit 4 performs photographing after the self-timer setting time elapses from when the operation to start photographing has been performed. The control unit 4 thus corresponds to a control unit according to the present invention.

Moreover, the control unit 4 corresponds to a control unit that compares time required for charging a flash with self-timer setting time according to the present invention. When the self-timer setting time is longer than the flash charging time, the control unit does not cause the flash charging operation to be performed before starting to count the self-timer setting time. The control unit causes the flash charging operation to be performed after starting to count the self-timer setting time. Further, when the self-timer setting time is shorter than the flash charging time, the control unit causes the flash charging operation to be performed before starting to count the self-timer setting time and after starting to count the self-timer setting time. Furthermore, the control unit suspends the live view display before causing the flash charging operation to be performed and resumes the live view display after the flash charging operation has ended.

According to the present exemplary embodiment, the self-timer setting time may be a fixed value, previously selected from a plurality of values by the photographer, or set to an arbitrary setting time. Further, according to the present exemplary embodiment, the flash charging time is calculated from the battery voltage and the voltage of the charging capacitor of the flash. However, the flash charging time is not limited to this value, and may be a predetermined time. Furthermore, according to the present exemplary embodiment, when the photographer half-presses the release switch, the photographing preparation operation is performed. However, a start of the photographing preparation operation is not limited to this case.

Moreover, the flash device can be a built-in type or an external type.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-211181 filed Sep. 14, 2009, which is hereby incorporated by reference herein in its entirety.

What is claimed is:

1. An imaging apparatus comprising:
an image sensor;
a display unit configured to display an image acquired by the image sensor;
a flash unit;
a flash charging unit configured to charge the flash unit;
an operation member configured to set a live view display mode and/or to set a self-timer photographing mode; and
a control unit configured (a) to perform a live view display of the image when the live view display mode is set (b) to perform photographing of the image after a self-timer setting time elapses when the self-timer photographing mode is set, (c) to inhibit the live view display from being performed during counting of the self-timer setting time when the live view display mode and the self-timer photographing mode are set, (d) to calculate a flash charging time for charging the flash unit, and (e) to compare the flash charging time and the self-timer setting time when the live view display mode and the self-timer photographing mode are set, wherein, if the self-timer setting time is longer than the flash charging time, the flash charging unit does not start charging before starting to count the self-timer setting time and starts charging the flash after starting to count the self-timer setting time.

2. The imaging apparatus according to claim 1, wherein if the self-timer setting time is shorter than the flash charging time, the flash charging unit starts charging the flash unit before starting to count the self-timer setting time and during counting of the self-timer setting time.

3. The imaging apparatus of claim 1, wherein the control unit calculates the flash charging time based on a voltage of a battery and a charging voltage of a capacitor within the flash unit.

4. A method of controlling an imaging apparatus including a display unit, a flash unit, a flash charging unit which charges the flash unit, a control unit which calculates a flash charging time for charging the flash unit, and an operation member which sets a live view display mode and/or sets a self-timer photographing mode, the method comprising:

determining whether the live view display mode and the self-timer photographing mode are set;

comparing the flash charging time and the self-timer setting time when the live view display mode and the self-timer photographing mode are set;

inhibiting the flash charging from being started before starting to count the self-timer setting time;

inhibiting the live view display from being performed during counting of the self-timer setting time; and starting the flash charging after starting to count the self-timer setting time, if the self-timer setting time is longer than the flash charging time.

5. The method of claim 4, wherein the imaging apparatus further includes a battery and the flash charging time is calculated based on a voltage of the battery and a charging voltage of the flash unit.

6. The method of claim 4, further comprising:

starting the flash charging before starting to count the self-timer setting time, if the self-timer setting time is shorter than the flash charging time; and inhibiting the live view display from being performed during counting of the self-timer setting time.

* * * * *